United States Patent
Cousin et al.

(10) Patent No.: US 11,745,150 B2
(45) Date of Patent: Sep. 5, 2023

(54) METHOD AND FACILITY FOR OXYGEN-DOPING OF WATERS FOR ANIMAL WATERING AND IN PARTICULAR POULTRY WATERING

(71) Applicant: L'Air Liquide, Société Anonyme pour l'Etude et l'Exploitation des Procédés Georges Claude, Paris (FR)

(72) Inventors: Franck Cousin, Saint Brevins les Pins (FR); Dominique Ibarra, Gif-sur-Yvette (FR); Philippe Campo, Montigny le Bretonneux (FR); Pauline Le Dru, Beaucouzé (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 191 days.

(21) Appl. No.: 16/763,958

(22) PCT Filed: Nov. 8, 2018

(86) PCT No.: PCT/FR2018/052764
§ 371 (c)(1),
(2) Date: May 13, 2020

(87) PCT Pub. No.: WO2019/097142
PCT Pub. Date: May 23, 2019

(65) Prior Publication Data
US 2020/0391164 A1    Dec. 17, 2020

(30) Foreign Application Priority Data
Nov. 14, 2017  (FR) ...................... 1760695

(51) Int. Cl.
*B01F 23/23*     (2022.01)
*B01F 23/236*    (2022.01)
(Continued)

(52) U.S. Cl.
CPC ............ *B01F 23/2362* (2022.01); *A01K 7/00* (2013.01); *A01K 39/02* (2013.01); *B01F 23/237612* (2022.01)

(58) Field of Classification Search
CPC ................ B01F 3/04808; B01F 3/0446; B01F 3/04503; B01F 5/0413; B01F 2003/04879
See application file for complete search history.

(56) References Cited

U.S. PATENT DOCUMENTS 5,075,016 A * 12/1991 Barnes ...................... C02F 1/78
                                                    210/760
6,063,295 A *  5/2000 Williams .................. C02F 1/00
                                                    210/744
(Continued)

FOREIGN PATENT DOCUMENTS

| JP | S58 63338 | 4/1983 |
| WO | WO 03 066070 | 8/2003 |
| WO | WO2006/073249 A1 * | 7/2006 ................ C02F 1/68 |

OTHER PUBLICATIONS

International Search Report for corresponding PCT/FR2018/052764, dated Feb. 13, 2019.

*Primary Examiner* — Joshua E Rodden
*Assistant Examiner* — Henry Hooper Mudd
(74) *Attorney, Agent, or Firm* — Yan Jiang

(57) ABSTRACT

An installation for rearing animals includes an injector; a water inlet line and a gas inlet line arriving in the injector; a source of oxygen or a gas mixture including oxygen, capable of delivering oxygen into the gas line; and a water recirculation loop including: a water tank, at atmospheric pressure, to supply the injector with fresh water; a coil capable of receiving water charged with dissolved oxygen from the injector through a pump, wherein the coil creates a water/oxygen contact time; and an overflow valve, to have the water resulting from the coil passed in order to be able (Continued)

to direct the water entirely to the animals' watering or partially to the animals' watering and partially back to the water tank. A method for rearing animals includes boosting water with dissolved oxygen up to saturation for animals' watering.

7 Claims, 1 Drawing Sheet

(51) Int. Cl.
*A01K 7/00* (2006.01)
*A01K 39/02* (2006.01)
*B01F 23/237* (2022.01)

(56) References Cited

U.S. PATENT DOCUMENTS

| | | | |
|---|---|---|---|
| 6,464,210 B1 * | 10/2002 | Teran | B01F 3/04 |
| | | | 261/79.2 |
| 2004/0200431 A1 | 10/2004 | Persinger | |
| 2006/0182722 A1 * | 8/2006 | Hering | A61K 35/12 |
| | | | 424/93.7 |
| 2007/0257381 A1 * | 11/2007 | Chuang | B01F 3/04 |
| | | | 261/76 |
| 2010/0282691 A1 * | 11/2010 | Fukai | C02F 1/72 |
| | | | 210/763 |

* cited by examiner

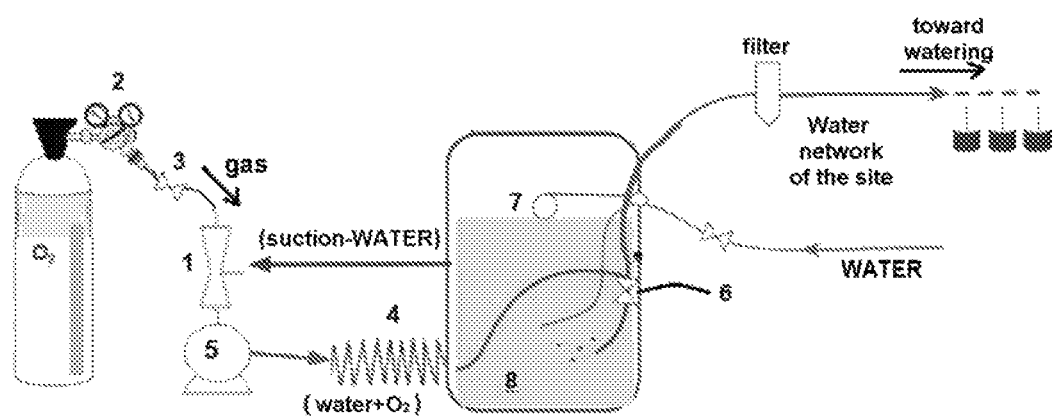

METHOD AND FACILITY FOR OXYGEN-DOPING OF WATERS FOR ANIMAL WATERING AND IN PARTICULAR POULTRY WATERING

CROSS-REFERENCE TO RELATED APPLICATIONS

This application is a § 371 of International Application PCT/FR2018/052764, filed Nov. 8, 2018, which claims § 119(a) foreign priority to France Patent Application 1760695, filed Nov. 14, 2017, the entire contents of which are incorporated herein by reference.

BACKGROUND

The present invention relates to the field of intensive animal husbandry, and in particular of poultry and pigs.

FIELD OF THE INVENTION

It should be remembered here, for example, that, for a chicken to reach the weight of 1.5 kg, it took approximately 120 days in 1920, approximately 44 days in 1980 and approximately only 33 days in 1998.

According to various studies, experimental surveys in such farms show that, at the same age (49 days), the average weight of a broiler doubled between 1967 and 1996. In addition, in recent years, consumer demand has evolved toward less fatty animals and pre-cut poultry meats.

These production objectives have been achieved thanks to the change in nutritional programs and rearing conditions, associated with the genetic selection of rapidly growing animals, with a low consumption index, low fattening and increased development of the muscle masses.

Genetics, hygiene, prophylaxis and the improvement in rearing conditions have, for the past twenty years, considerably reduced the mortality of poultry on farms.

Nevertheless, it is necessary to take into account the following aspects which appear in all the studies issued on the subject:
  rapid body growth increases oxygen requirements and heat production.
  the increase in the output of pectoral mass accentuates the imbalance between the development of muscle mass and that of other tissues, such as the kidney, heart and lungs. In current farms, the change in the growth characteristics is sometimes accompanied by an increase in the frequency of failures of the cardiovascular and respiratory systems, characterized by an increasing number in "heat strokes", "sudden death" syndromes and ascites (accumulation of fluid in the peritoneal cavity).

SUMMARY OF THE INVENTION

The studies available in this area can be summarized by the fact that oxygen is a limiting factor which can help explain the frequency of cardiovascular and respiratory diseases in broilers. Comparison of genotypes having variable growth rates shows that the high incidence of ascites and the high growth rate are associated with a low oxygen pressure and a high $CO_2$ pressure in venous blood. Insufficient oxygen availability thus appears to be a major cause of dysfunctionings of the cardiovascular and respiratory systems in rapidly growing chickens.

The above demonstrates the need to restore a balance between the metabolic needs imposed by selection for rapid growth and the ability of the respiratory system, which supplies oxygen, to meet them.

One possible approach would be to increase the oxygen content in the environment of the farmed chicken; unfortunately, intensive farms require strong ventilation in order to evacuate the heat and the humidity produced by the fowls, and thus the oxygen consumption, in order to change from 20.9% to 27%, for example, would be totally unacceptable and would definitively penalize the solution on an economic level.

One of the objectives of the present invention is consequently to provide a new solution of conditions for rearing such poultry and pigs, introducing a solution to the problems pointed out above.

For this, as will be seen in more detail in what follows, it is proposed, according to the present invention, to boost the water for watering animals with dissolved oxygen, and more precisely to maximize the dissolved oxygen content of the water for watering poultry, i.e. up to saturation.

The aim is preferably to carry out this oxygen doping so as to reduce the oxygen loss between the doping operation and the consumption by the animals, this being achieved by injecting the oxygen at the last moment just before consumption by the poultry. The use of an in-line injector promotes the achievement of such a result.

For the pig sector, watering generally represents 93.6% of the total water consumed in a farrow-to-finish farm, i.e. 1330 l per pig produced (14.5 l per kg of carcass).

In poultry farming, water for the watering of the animals generally represents almost 90% of the use. This represents from 3.1 l to 5.0 l per fowl produced, according to the species considered (from export chicken to turkey).

It is estimated that the need for water generally varies between 1.6 and 1.8 times the consumption of feed.

The water of industrial watering systems currently most often contains between 5 and 8 mg of oxygen per liter; the objective according to the present invention is consequently to achieve oxygen saturation of this water, preferentially by virtue of an injection of pure oxygen.

However, it should be noted that the temperature of the water is very variable depending on the installations considered and that the amounts of oxygen to be added will thus have to be adjusted accordingly.

The amounts of oxygen to be added to a water in order to saturate it, according to the temperature of this water, are indeed well listed in the literature, and it can consequently be considered that, in view of the water temperatures commonly practiced in such farms, the amount of oxygen to be added will generally be between 20 and 50 mg/l of water but most often will be in the vicinity of 30 mg of oxygen per liter of water.

The invention thus relates to a method for rearing animals and in particular poultry or pigs, where water is supplied to the animals in order to water them, which is characterized in that the water for watering the animals is boosted with dissolved oxygen up to saturation.

As was indicated above, the saturation of a water will depend on the quality of the water, on the temperature, on the residence time of the oxygen and on the velocity of the water, but these are processes which a person skilled in the art knows without it being necessary to expand further.

BRIEF DESCRIPTION OF THE FIGURES

For a further understanding of the nature and objects for the present invention, reference should be made to the following detailed description, taken in conjunction with the accompanying drawings, in which like elements are given the same or analogous reference number.

The appended FIG. 1 illustrates an embodiment of an installation suitable for the implementation of the invention, and the presence in this FIGURE of the following elements may be noted:

an injector 1, for example of the Venturi type, making it possible to inject a gas into water;

a water inlet line ("WATER") and a gas inlet line ("GAZ") arrive at this injector, which gas line is here connected in its upstream part to a store of oxygen (represented by a cylinder) or of a mixture of gases comprising oxygen, for example a mixture of 70% oxygen and 30% $CO_2$;

a pressure-reducing valve 2;

a regulating valve 3 (gas-regulating valve which makes it possible, as a result of its calibration, to inject a chosen amount of gas into the injector);

a coil 4; the length of the coil makes possible a chosen gas/water contact time, preferentially of greater than 10 seconds, and preferably located between 10 and 30 seconds;

a water circulation pump 5; the water pump makes it possible to achieve high water in the coil;

an overflow valve 6;

a float valve 7;

a tank of water at atmospheric pressure 8.

DETAILED DESCRIPTION OF THE PREFERRED EMBODIMENTS

This installation proposal is entirely advantageous for limiting capital costs, since it avoids the (expensive) use of an oxygen analyzer.

The "WATER" line arriving from the right supplies the bath with "fresh" or new water, thus making it possible for the tank to be first filled with water before starting; the float valve 7 (for example of the WC water flush type) makes it possible to maintain a constant water level in the tank.

In this instance, the use of a tank of water at atmospheric pressure makes it possible both to maintain a low pressure toward the watering network and to maintain a high pressure in the coil in order to dissolve the oxygen.

An overflow valve always maintains the same pressure in the circuit whatever the water consumption.

The oxygen injection system operates when the watering network is supplied with water; in the event of a shutdown, the system is shut off.

A "suction water" line leaves from the reservoir, which line sends water from the reservoir to the injector; it is thus a mixture of recycled water and of fresh water. In other words, except when the animals are not consuming water, the injector receives 100% recycled water.

(It should be remembered that the animals are always consuming water; in order to stop them, the light has to be switched off).

The water can be directed, via the pump 5 and the dissolving coil 4, to the watering zone; it passes outside the tank 8, as will have been understood, passing through the overflow valve 6. The overflow valve is also located outside the bath but it may happen that, for issues of location/housability, the overflow valve can be positioned in the water of the tank.

As seen in the FIGURE, the installation makes it possible, if necessary, to pour a part of the water originating from the coil into the tank and the other part to the watering.

As will be clearly apparent to a person skilled in the art on reading the above, the installation provided here is noteworthy in that it gives:

A residence time of the water/$O_2$ mixture;

A velocity of the water in the coil to guarantee a good dissolution of the water;

A relatively high pressure in the coil;

A relatively low pressure in the watering circuit.

This is achieved by virtue of the system provided for recycling water comprising a pump, a coil, an overflow valve and an open tank which makes it possible to be at atmospheric pressure.

Comparative tests were carried out under the following actual conditions:

2 strictly identical buildings;

approximately 25,000 chickens per building;

a 40-day rearing cycle;

3 series of tests.

Initial content of the water: 5 to 8 mg of oxygen per liter of water (according to the temperature); Target targeted=30 to 40 mg of oxygen per liter of water.

The average of the 3 repetitions shows an increase of 5% in ICE and an ADG of more than 2 g.

ICE: Total amount of feed ingested divided by the number of kilos of poultry of economic value at the slaughterhouse;

ADG: Average Daily Gain.

A comparative autopsy carried out by a specialist body made it possible to demonstrate, with regard to the fowls examined, the presence of less abdominal fat (8%) on the animals which had consumed oxygen-enriched water. That is, an orientation of their metabolism in favor of the conversion into proteins rather than into fats:

|  | Without $O_2$ | With $O_2$ |
| --- | --- | --- |
| Average weight | 1.535 kg | 1.735 kg |
| Abdominal fat | 25 g | 23 g |

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. An installation for rearing animals having a water conveying system to provide water to said animals, in particular for rearing poultry and pigs, the installation comprising:

an injector, configured and adapted to inject a gas into water;

a water inlet line and a gas inlet line, both fluidically connected to the injector, respectively;

a source of oxygen gas, or a source of a gas mixture comprising oxygen gas, fluidically connected to the gas line and capable of delivering the oxygen, or the gas mixture comprising oxygen, into the gas line; and a water recirculation loop including:

a water tank, at atmospheric pressure, connected to the water inlet line, and configured and adapted to supply the injector with fresh water;

a coil fluidically connected to a pump, the pump being fluidically connected to the injector, wherein the coil is capable of receiving water charged with oxygen gas from the injector through the pump, wherein the coil is configured and adapted to create a water/oxygen contact time; and an overflow valve, configured and adapted to direct a flow of an oxygenated water resulting from the coil to the animals for watering, or partially to the animals for watering and partially back to the water tank, and maintain the same pressure in the flow of the oxygenated water resulting from the coil to the animals for watering whatever the oxygenated water is consumed or not, wherein a pressure of the flow of the oxygenated water resulting from the coil to the animals for watering is lower than atmospheric pressure, wherein the oxygenated water is boosted with dissolved oxygen up to saturation.

2. The installation of claim 1, wherein no oxygen analyzer is installed.

3. A method for rearing animals through conveying an oxygenated water to animals for watering, in particular for rearing poultry or pigs, the method comprising the steps of injecting oxygen or oxygen-containing gas to water through an injector to charge the water with oxygen gas;

pumping the water charged with the oxygen gas from the injector into and through a coil to create a water/oxygen contact time therein; and supplying the oxygenated water resulting from the coil to the animals, wherein the oxygenated water supplied to the animals is saturated with dissolved oxygen under ambient conditions, wherein a pressure of the oxygenated water is lower than atmospheric pressure and maintained the same whatever the oxygenated water is consumed or not.

4. The installation of claim 1, wherein the injector is a Venturi type injector.

5. The installation of claim 1, wherein the gas mixture comprise 70% oxygen and 30% $CO_2$.

6. The installation of claim 1, wherein the water/oxygen contact time is greater than 10 seconds.

7. The installation of claim 1, wherein the water/oxygen contact time is between 10 and 30 seconds.

* * * * *